United States Patent [19] — Anderson

[11] 3,800,454

[45] Apr. 2, 1974

[54] PERPETUAL CALENDAR AND METHOD OF DETERMINING DAYS OF WEEK FROM CALENDAR DATES

[76] Inventor: Philip E. Anderson, 245 Russell Ave. South, Minneapolis, Minn. 55405

[22] Filed: Apr. 12, 1972

[21] Appl. No.: 243,156

[52] U.S. Cl. .................................................. 40/109
[51] Int. Cl. ............................................ G09d 3/10
[58] Field of Search ...................... 40/109, 119, 107

[56] References Cited

UNITED STATES PATENTS

| | | | |
|---|---|---|---|
| 1,785,866 | 12/1930 | Huene | 40/109 |
| 1,949,328 | 2/1934 | Pinkerton | 40/109 |
| 3,427,740 | 2/1969 | Heskes | 40/109 |
| 3,605,307 | 9/1971 | Dickson | 40/109 |

FOREIGN PATENTS OR APPLICATIONS

| | | | |
|---|---|---|---|
| 2,000,957 | 7/1970 | Germany | 40/109 |

*Primary Examiner*—Robert W. Michell
*Assistant Examiner*—J. H. Wolff
*Attorney, Agent, or Firm*—Merchant, Gould, Smith & Edell

[57] ABSTRACT

Tables of years, months of the year, and day dates of a month, the years, months and day dates each having a given numerical value. These values are such that a simple arithmetical process enables one to determine on which day of the week any given calendar date falls. The tables of years contains portions relating to Julian, Old Style, and Gregorian systems.

2 Claims, 4 Drawing Figures

FIG. 1

PERPETUAL CALENDAR
FROM BEGINNING OF CHRISTIAN ERA TO 2800

| HUNDRED YEAR PERIODS | JULIAN 0 TO OCT. 4, 1582 | | | | | | | OLD STYLE * | | | GREGORIAN OCT. 15, 1582 TO 2800 | | | | | YEAR |
|---|---|---|---|---|---|---|---|---|---|---|---|---|---|---|---|---|
| | 2 9 | 3 10 | 4 11 | 5 12 | 6 13 | 0 7 14 | 1 8 15 | 15 | 16 | 17 | 15 | 16 20 24 | 17 21 25 | 18 22 26 | 19 23 27 | LAST TWO FIGURES OF DESIRED YEAR |
| YEAR VALUES | 3 | 2 | 1 | 0 | 6 | 5 | 4 | 4 | 3 | 2 | | 0 | 5 | 3 | 1 | 00 |
| | 4 | 3 | 2 | 1 | 0 | 6 | 5 | 5 | 4 | 3 | 2 | 1 | 6 | 4 | 2 | 01 29 57 85 |
| | 5 | 4 | 3 | 2 | 1 | 0 | 6 | 6 | 5 | 4 | 3 | 2 | 0 | 5 | 3 | 02 30 58 86 |
| | 6 | 5 | 4 | 3 | 2 | 1 | 0 | 0 | 6 | 5 | 4 | 3 | 1 | 6 | 4 | 03 31 59 87 |
| | 1 | 0 | 6 | 5 | 4 | 3 | 2 | 2 | 1 | 0 | 6 | 5 | 3 | 1 | 6 | 04 32 60 88 |
| | 2 | 1 | 0 | 6 | 5 | 4 | 3 | 3 | 2 | 1 | 0 | 6 | 4 | 2 | 0 | 05 33 61 89 |
| | 3 | 2 | 1 | 0 | 6 | 5 | 4 | 4 | 3 | 2 | 1 | 0 | 5 | 3 | 1 | 06 34 62 90 |
| | 4 | 3 | 2 | 1 | 0 | 6 | 5 | 5 | 4 | 3 | 2 | 1 | 6 | 4 | 2 | 07 35 63 91 |
| | 6 | 5 | 4 | 3 | 2 | 1 | 0 | 0 | 6 | 5 | 4 | 3 | 1 | 6 | 4 | 08 36 64 92 |
| | 0 | 6 | 5 | 4 | 3 | 2 | 1 | 1 | 0 | 6 | 5 | 4 | 2 | 0 | 5 | 09 37 65 93 |
| | 1 | 0 | 6 | 5 | 4 | 3 | 2 | 2 | 1 | 0 | 6 | 5 | 3 | 1 | 6 | 10 38 66 94 |
| | 2 | 1 | 0 | 6 | 5 | 4 | 3 | 3 | 2 | 1 | 0 | 6 | 4 | 2 | 0 | 11 39 67 95 |
| | 4 | 3 | 2 | 1 | 0 | 6 | 5 | 5 | 4 | 3 | 2 | 1 | 6 | 4 | 2 | 12 40 68 96 |
| | 5 | 4 | 3 | 2 | 1 | 0 | 6 | 6 | 5 | 4 | 3 | 2 | 0 | 5 | 3 | 13 41 69 97 |
| | 6 | 5 | 4 | 3 | 2 | 1 | 0 | 0 | 6 | 5 | 4 | 3 | 1 | 6 | 4 | 14 42 70 98 |
| | 0 | 6 | 5 | 4 | 3 | 2 | 1 | 1 | 0 | 6 | 5 | 4 | 2 | 0 | 5 | 15 43 71 99 |
| | 2 | 1 | 0 | 6 | 5 | 4 | 3 | 3 | 2 | 1 | | 6 | 4 | 2 | 0 | 16 44 72 |
| | 3 | 2 | 1 | 0 | 6 | 5 | 4 | 4 | 3 | 2 | | 0 | 5 | 3 | 1 | 17 45 73 |
| | 4 | 3 | 2 | 1 | 0 | 6 | 5 | 5 | 4 | 3 | | 1 | 6 | 4 | 2 | 18 46 74 |
| | 5 | 4 | 3 | 2 | 1 | 0 | 6 | 6 | 5 | 4 | | 2 | 0 | 5 | 3 | 19 47 75 |
| | 0 | 6 | 5 | 4 | 3 | 2 | 1 | 1 | 0 | 6 | | 4 | 2 | 0 | 5 | 20 48 76 |
| | 1 | 0 | 6 | 5 | 4 | 3 | 2 | 2 | 1 | 0 | | 5 | 3 | 1 | 6 | 21 49 77 |
| | 2 | 1 | 0 | 6 | 5 | 4 | 3 | 3 | 2 | 1 | | 6 | 4 | 2 | 0 | 22 50 78 |
| | 3 | 2 | 1 | 0 | 6 | 5 | 4 | 4 | 3 | 2 | | 0 | 5 | 3 | 1 | 23 51 79 |
| | 5 | 4 | 3 | 2 | 1 | 0 | 6 | 6 | 5 | 4 | | 2 | 0 | 5 | 3 | 24 52 80 |
| | 6 | 5 | 4 | 3 | 2 | 1 | 0 | 0 | 6 | 5 | | 3 | 1 | 6 | 4 | 25 53 81 |
| | 0 | 6 | 5 | 4 | 3 | 2 | 1 | 1 | 0 | 6 | 5 | 4 | 2 | 0 | 5 | 26 54 82 |
| | 1 | 0 | 6 | 5 | 4 | 3 | 2 | 2 | 1 | 0 | 6 | 5 | 3 | 1 | 6 | 27 55 83 |
| | 3 | 2 | 1 | 0 | 6 | 5 | 4 | 4 | 3 | 2 | 1 | 0 | 5 | 3 | 1 | 28 56 84 |

| MONTH VALUES | 1 | 2 | 3 | 4 | 5 | 6 | 0 |
|---|---|---|---|---|---|---|---|
| MONTHS JAN=1, FEB=2 ETC | 5 | 8 ② | 2 3 11 | 6 | 9 12 | 4 7 ① | 1 10 |

*OCT. 5, 1582 TO SEPT. 2, 1752

NOTE: ① AND ② INDICATE JANUARY AND FEBRUARY FOR LEAP YEAR ONLY

| DATE VALUES | 1 | 2 | 3 | 4 | 5 | 6 | 0 |
|---|---|---|---|---|---|---|---|
| DATES | 1 | 2 | 3 | 4 | 5 | 6 | 7 |
| | 8 | 9 | 10 | 11 | 12 | 13 | 14 |
| | 15 | 16 | 17 | 18 | 19 | 20 | 21 |
| | 22 | 23 | 24 | 25 | 26 | 27 | 28 |
| | 29 | 30 | 31 | | | | |

| DAY VALUES | | |
|---|---|---|
| SUN. -1 | WED. -4 | SAT. -0 |
| MON. -2 | THUR. -5 | |
| TUE. -3 | FRI. -6 | |

PERPETUAL CALENDAR AND METHOD OF DETERMINING DAYS OF WEEK FROM CALENDAR DATES

Perpetual calendars have been produced in different forms, many of these utilizing a plurality of pages of monthly calendar tables, and tables of years each relating to different pluralities of the monthly calendar tables. Others utilize various forms of circular slide rule type calendars, some of these being quite involved in structure and operation.

An important object of this invention is the provision of a calendar in which a day of the week of any calendar date can be quickly and easily determined.

Another object of this invention is the provision of a perpetual calendar having a minimum number of tables for determining days of the week from given calendar dates.

Still another object of this invention is the provision of a novel method for quickly and easily determining the day of the week of any given calendar date.

To the above ends, I provide a calendar including a table of years, each year being designated or represented by a given numeral value; a table of months, each month being represented by a given numeral value; and a table of date numbers each represented by a given numeral value; said numeral values all being between zero and six and being such that difference between the total of given ones of said year, month and date values, and the highest multiple of the numeral seven below this total, will be a numeral representing a given day of the week.

Another form of the calendar of this invention is in the nature of a slide rule including a sheet-like main body member having century and year figures imprinted thereon, a plurality of movable scale members and a slide. One scale member contains the numeral values for the calendar year; a second scale member having the months of a year and numeral values for the months; a third scale member having the dates of a month and numeral values for the dates; and a fourth scale member having numeral values for the dates of a week. The slide has openings or windows therein for aligning months and day dates with given years, and providing easy showing of aligned numeral values and a total thereof.

DESCRIPTION OF THE DRAWINGS

FIG. 1 is a view in front elevation of a preferred embodiment of the perpetual calendar of this invention;

DETAILED DESCRIPTION OF THE PREFERRED EMBODIMENT

Figure 2:
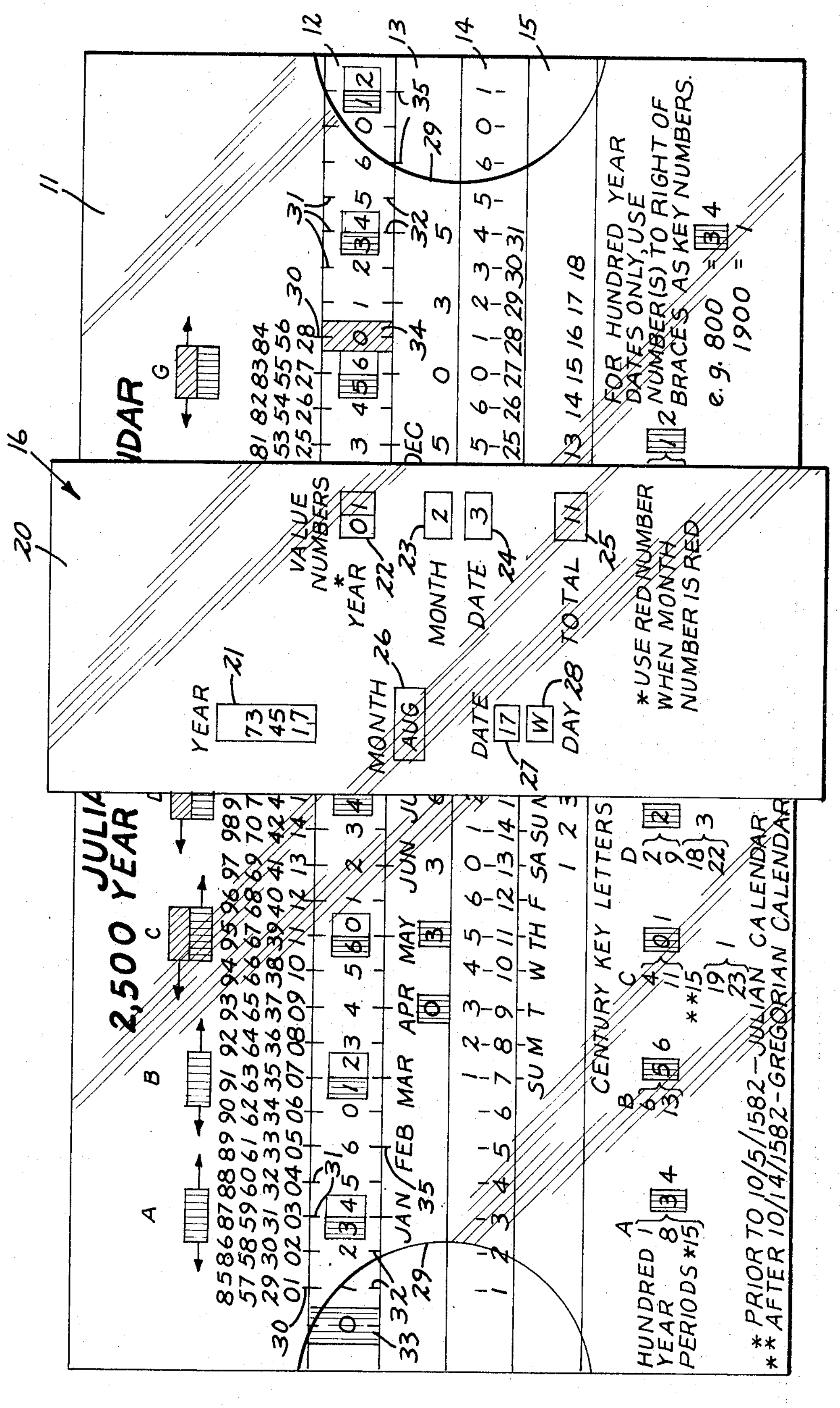
FIG. 2 is a view in front elevation of a modified form of the calendar of FIG. 1.

The calendar illustrated in FIG. 1 is in the nature of a rectangular flat card upon which is imprinted or otherwise illustrated a plurality of numerical tables. One of the tables, indicated generally at 1, is divided into table sections 2, 3, and 4, the table section 2 containing century or hundred year periods from zero to and including a numeral 27, this latter numeral indicating what is commonly known as the 28th century. The table section 3 lists all of the years of one century, and the table section 4 contains numeral values for each year of any century from the year one to and including the year 2,799. It will be noted that the table sections 2 and 4 include centuries and numeral values for the Julian and "Old Style" calendars as well as the Gregorian calendar. It will be further noted that the year numeral values are all single digit numerals, and are all numerals between zero and six inclusive.

The tables on the card or sheet of FIG. 1 include a table 5 which includes the 12 months of one year identified consecutively by consecutive numerals from one to twelve inclusive. The 12 months of the year are given numeral values between zero and six. In the table 5, it will be seen that the months of January and February, identified by the numerals one and two respectively, are noted twice numerically, and that one of each of these numerals representing January and February is enclosed in a circle. As shown on the table, and indicated at 6 the circled numerals one and two are used in determining days of calendar dates in the first two months in leap years.

A table of day dates is indicated at 7, and lists all of the dates of a month from one to 31, different ones of the day dates having numeral date values. These data numeral values are single digit numerals, as are the month numeral values in table 5. Further, like the month and year numeral values, the date numeral values are from zero to six inclusive.

Numeral values for each day of a week are set forth in a table 8, the days being numbered consecutively from one through six, beginning with Sunday as one, Monday as two, through Friday as six. It will be noted that Saturday is given a numeral value of zero.

By giving each year, month and day date a single digit numeral value between zero and six, it is a simple matter to determine on which day of the week any calendar date falls. To accomplish this it is only necessary to find the year numeral value in table 1, the month numeral value in table 5, and the data numeral value in table 7 and add these three numerals. The sum of these numerals is then divided by seven. The highest multiple of seven below the sum is subtracted from the sum, the difference being the day value number for the day of the week. In the event that the sum of the year, month and date values is a true multiple of seven, there will be a zero difference between the sum and the highest multiple of seven, and the day of the week sought will be Saturday.

As an example of the above, it may be assumed that one wishes to determine the day of the week corresponding to the date July 4, 1776. According to table 1, the numeral value for the year 1776 is two. According to table 5, the numeral value for July, the seventh month is six, and according to table 7, the fourth day of the month has a numeral value of four. By adding these numeral values, a sum of 12 is obtained. Seven, being the highest multiple of seven below twelve, is subtracted from 12, leaving a remainder of five. Referring to table 8, it is found that the numeral five indicates Thursday. Thus, it is determined that July 4, 1776, fell on Thursday. Should a date be chosen wherein the year, month and date numeral values totalled and exact multiple of seven, the difference between this multiple and the sum of the numeral values is zero. The date is then indicated as falling on a Saturday.

From the above, it can be seen that a method for determining the day of the week of any calendar date comprises the providing of calendar years, months of the year, day dates of the month, and days of a week, with given numeral values; adding the numeral values of the year, month and date of a desired calendar date; dividing the sum of the added numeral values by seven to determine the highest whole number multiple of seven below this sum, and subtracting the highest multiple from the sum, the difference being the numeral value of the day of the week corresponding to the desired calendar date. This method holds true for any of the well known calendar systems, such as the Julian, Old Style, and Gregorian calendar systems.

It will be further appreciated that, although the Gregorian calendar centuries are shown in FIG. 1 as extending to 27, they may be extended to as many centuries in the future as the Gregorian system might be used. The first vertical column in the Gregorian portion of table section 2 contains numeral values for the years from 1582 through 1599. From the year 1600, the centuries or one hundred year indications in the Gregorian portion of table section 2 may be carried to infinity.

MODIFICATION, FIGS. 2–4

Figure 4:
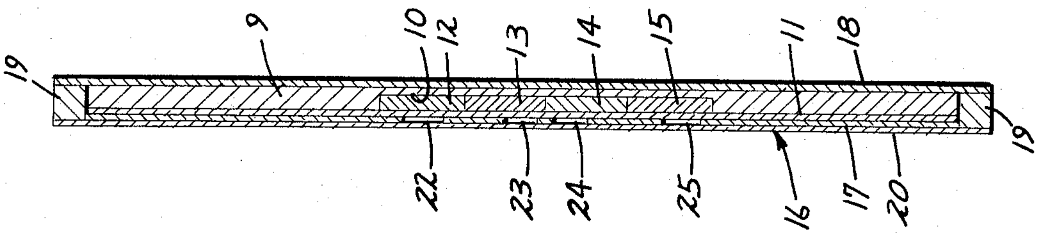
FIG. 4 is a transverse section taken on the line 4—4 of FIG. 3.
Figure 3:
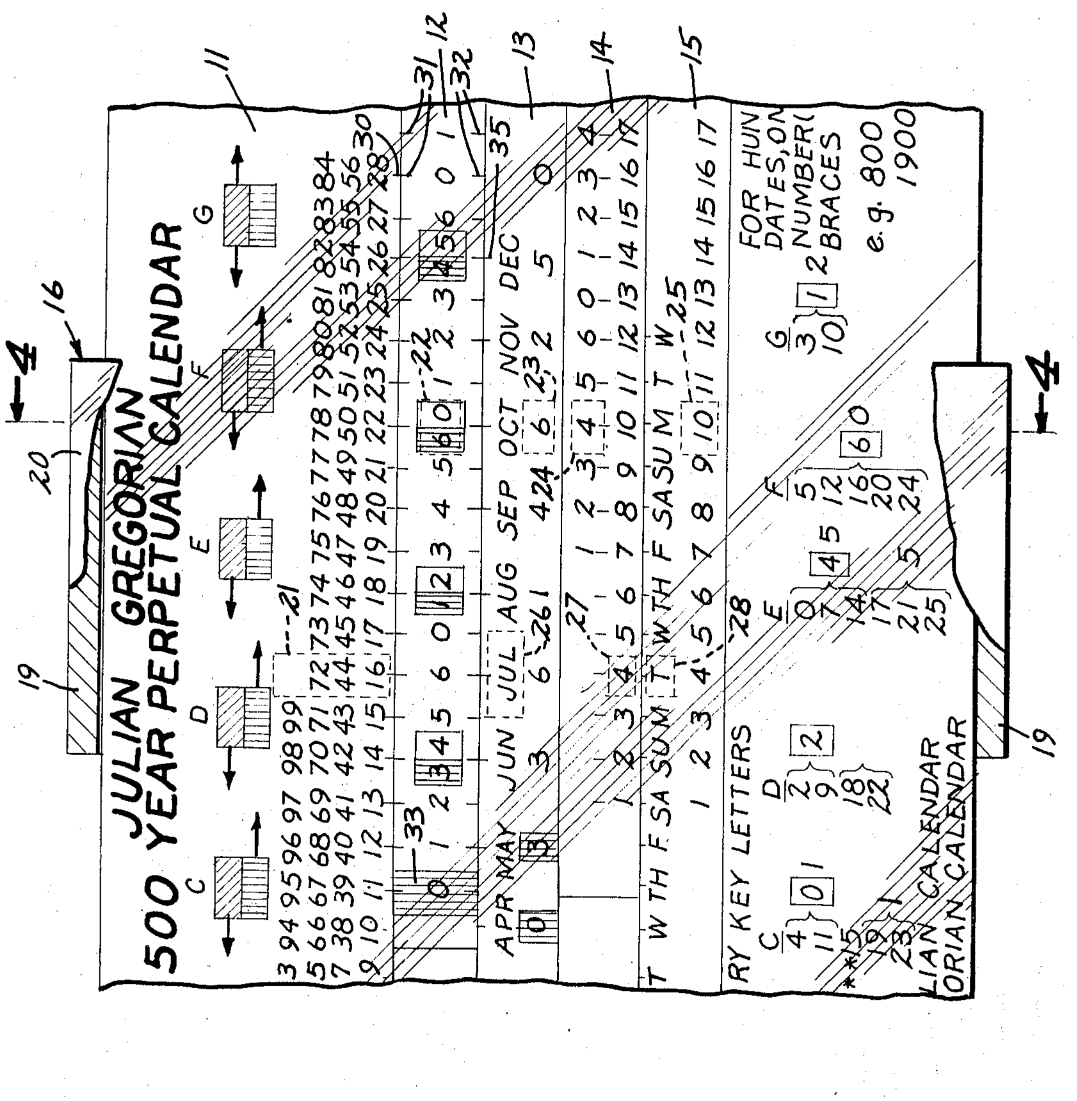
FIG. 3 is a fragmentary view corresponding to a portion of FIG. 2, some parts being broken away and some parts being shown in section.

The arrangement illustrated in FIGS. 2–4 is in the nature of a slide rule structure comprising a sheet-like main body 9 defining a forwardly opening longitudinal channel 10 and having its front surface covered with a transparent wall 11. A plurality of elongated opaque scale members 12, 13, 14 and 15 are mounted in the channel 10 in side by side sliding engagement for independent movements longitudinally of the channel 10.

A generally rectangular opaque slide 16 comprises front and rear walls 17 and 18 overlying the transparent wall 11 and the rear surface of the body 9 respectively, and top and bottom wall portions 19 connecting the front and rear walls 17 and 18. The front slide wall 17 is preferably covered with a layer of transparent material 20. The front wall 17 of the slide 16 is formed to provide a plurality of openings therethrough, the openings being indicated at 21, 22, 23, 24, 25, 26, 27 and 28. As shown in FIG. 2, the opening 21 overlies a portion of the body 9 above the channel 10 therein, the opening 22 overlying the scale member 12. The openings 23 and 26 are disposed in laterally spaced apart relationship and overly the scale member 13. In like manner, the openings 24 and 27 overly laterally spaced portions of the scale member 14 the openings 25 and 28 also being disposed in laterally spaced apart relationship and overlying spaced portions of the scale member 15. The opposite ends of the body 9 and front wall 11 thereof are notched or cut away, as indicated at 29 to permit the user to easily grasp opposite ends of the scale members 12–15 to move the same independently of one another longitudinally with respect to the body 9.

With reference particularly to FIGS. 2 and 3 it will be seen that the upper portion of the body 9 has imprinted on its front surface a plurality of longitudinally spaced rectangles each underlying a different capital letter A, B, C, D, E, F and G. The rectangles underlying the capital letters A and B are lines to indicate the color red, the rectangles underlying the letter C through G having lower halves lined to indicate the color red and upper halves lined to indicate the color green. Further, each of the colored sections is provided with one or more longitudinally extended arrows for a purpose which will hereinafter become apparent. Underlying the colored rectangles are numerals from numeral 01 through numeral 99, these numerals being arranged in vertical and horizontal rows, the vertical rows thereof being positioned to register with the opening 21 in the slide 16. The front surface of the body 9 has imprinted thereon below the channel 10 groups of numerals indicating one hundred year periods, each group thereof underlying a different capital letter between A and G. These letters correspond with like letters above the color coded rectangles at the upper portion of the body 9. With further reference to FIGS. 2 and 3, it will be seen that each vertical row of year numerals is provided with an underlying marker line 30 adjacent the upper marginal edge of the channel 10.

The scale member 12 is imprinted adjacent its upper and lower edges with marker lines 31 and 32 respectively that are spaced apart longitudinally of the scale member 12 a distance equivalent to the spacing of the marker lines 30, each marker line 32 being aligned with a different one of the marker lines 31. Between each pair of aligned marker lines 31 and 32, the front surface of the scale member 12 is imprinted with numerals from 0 to 6 inclusive. Some of the pairs of aligned marker lines 31 and 32 have single numerals therebetween, others having rectangles therebetween, these rectangles being divided into halves, one half being colored, the other half being uncolored. In FIGS. 2 and 3 the colored halves are lined to indicate the color red. Each half of the rectangle has a different numeral imprinted thereon, the numerals of the scale member 12 being numeral values for given years of given centuries. The opening 22 in the slide 16 is positioned to register with the numerals on the scale member 12. It will be further noted, with reference to FIG. 2, that an area, indicated at 33, adjacent one end of the scale member 12, and containing a numeral zero, is lined to indicate the color red, a second area toward the opposite end of the scale member 12, and containing another numeral zero, is lined to indicate the color green, and indicated at 34. The numeral values of the scale member 12 are labelled key numbers on the slide 16.

The scale member 13 has its front surface imprinted with abbreviations of the 12 months of the year, and with numeral values for the several months of the year. The months of the year on the scale member 13 are adapted to selectively register with the opening 26 in the slide 16, the month numeral values being registrable with the opening 23 in the slide 16. It will be noted that the two numerals at the left hand end of the group thereof on the scale member 13 are disposed in rectangular boxes lined to indicate the color red. These boxed numerals are the numeral values for the months of January and February. Marker lines 35 are imprinted on the front surface of the scale member 13 at the upper longitudinal edge surface thereof, and are adapted to be aligned with given ones of the marker lines 32, to properly center the month numeral values in their respective openings 26 and 23 of the slide 16.

The scale member 14 has its front surface imprinted with the date numbers of a month from 1 to 31 inclusive, these numbers reading from left to right longitudinally of the scale member 14. Above the row of date numbers is the second row of longitudinally spaced numeral values numbering from 0 to 6. The opening 24 in the slide 16 is registrable with the date numeral values, the opening 27 being registrable with the date numbers.

The scale member 15 has imprinted thereon in longitudinally spaced relationship abreviations of the days of the week in consecutive relationship beginning with Sunday and ending with the third following Wednesday. Each of these days of the week is identified with a numeral beginning with the numeral 1 for the first Sunday and ending with the numeral 18 for the third Wednesday. The abbreviations for the days of the week are registrable selectively with the opening 28 in the slide 16, the numerals on the scale member 15 being selectively registrable with the opening 25 in the slide 16.

OPERATION, FIGS. 2-4

The calendar illustrated in FIGS. 2–4 utilizes the same principle as that illustrated in FIG. 1, to determine the day of the week in which a given calendar date occurs. Further, the calendar of FIGS. 2–4 gives a visual indication of the day of the week upon which a given calendar date falls, so that the operator does not need to do more than add three numeral values together to arrive at the desired day of the week. The calendar of FIGS. 2–4 is operated as follows:

Assuming that it is desired to determine on which day of the week the date July 4, 1972, falls. The user consults the lower portion of the body 9 and finds that the century 1900 falls under the key letter C. Then, consulting the upper portion of the body 9 the user notes that the year 72 is to the right of the colored section underlying the letter C. The arrow of this section pointing generally toward the year number 72 extends from the red colored portion underlying the key letter C. This being the case, the scale member 12 is moved longitudinally of the body 9 until the numeral zero in the red area 33 underlies the century key letter C on the upper portion of the body 9. The slide 16 is then positioned so that the year numeral 72 appears in the opening or window 21. In this position of the slide 16, a double numeral 60 appears in the opening 22. The scale member 13 is them moved until the desired month, namely July, appears in the opening 26 of the slide 16. With the scale member 13 thus positioned, the numeral 6 appears in the opening 23. The scale member 14 is then moved longitudinally of the body 9 and slide 16 until the desired calendar date, namely 4, appears in the opening 27. With the scale member 14 thus positioned, the value numeral 4 appears in the opening 24. Then, in view of the fact the value numeral 4 of the month July is not colored red, the user or operator then adds the numeral 0 in the opening 22, the numeral 6 in opening 23 and numeral 4 in opening 24, and arrives at a sum of 10. The scale member 15 is then moved so that the numeral 10 appears in the opening 25. The numeral seven, being the highest multiple of seven below ten, the difference therebetween is three, which numbering from Sunday as one, the day of the week of July 4, 1972, is Tuesday. This is indicated or shown through the opening 28.

The above procedure is followed for any given calendar date with the following exception. If the year number in a given hundred year period is disposed to the left of the given century key letter at the upper portion of the body 9 the scale member 12 will be moved to dispose the green area 34 under the given century key letter. Thereafter, the procedure is the same as above described. The directions on the lower portion of the body 9 and the slide 16 relate to leap years, even hundred year dates and the calendar which it is desired to use, whether Julian or Gregorian. It will be noted that the calendar of FIGS. 2–4 does not include the so-called "Old Style" calendar.

The range of the Gregorian calendar portion of the modification of FIGS. 2–4 may be extended beyond the 25 hundred year century by adding numerals in four year increments to each of the columns C, D, E and F on the lower portion of the front surface of the calendar body 9. For instance, the column of one hundred year numbers under the century key letter C could be extended to include 27, 31, 35, 39, etc. The other columns under D, E and F could be extended in the same manner.

It will be further appreciated that both calendars of FIG. 1 and FIGS. 2–4 could be condensed if desired, to include only the Gregorian calendar, which, in itself, could be condensed to include as few centuries, or a single century, as desired. These modifications, as well as others, may be made without departure from the spirit and scope of the invention, as defined in the claims.

I claim:

1. A calendar comprising an elongated body member; four elongated scale members having mounting means for sliding movements relative to each other and to said body member; and a slide member overlying a portion of said body and said member and said scale members and having mounting means for sliding movements relative to the body scale members in the direction of sliding movements of the scale members; said body member having a plurality of calendar years imprinted therealong; one of said scale members having a plurality of single digit numerals spaced apart in the direction of movement thereof and representing given calendar years; another of said scale members having the months of the year and unique single digit numerals representing said months imprinted thereon, said months and said single digit month representing numerals being spaced apart in the direction of movement of the scale members; another of said scale members having the calendar dates of a month imprinted therealong and particular single digit numerals representing given dates of the month, said calendar dates of the month and their respective single digit numerals being spaced apart longitudinally of the direction of movement of said scale members; another of said scale members having the days of a week and unique numerals representing said days imprinted thereon, said days and day representing numerals being spaced apart in the direction of movement of said scale members; said slide member having a first group of four aligned openings therein each positioned to have a respective year, month, date, and day representing numeral visible therethrough, and a second group of four aligned openings each positioned to have a respective year, month, date, and day of the week visible therethrough; said single digit numerals being so arranged on their respective scale members that, when any given year, month and date of the month appear in their respective openings of the second group thereof in said slide member, their respective single digit numerals will appear in respective openings of the first group thereof, whereby, when the scale member having the days of the week imprinted thereon is moved so that a numeral which is the sum of the single digit numerals appearing in the first three openings of the first group thereof is visible in the fourth opening of the first group, the day of the week for the given date appearing in the first three openings of the second group of openings will appear in the fourth opening of the second group of openings.

2. The calendar defined in claim 1 in which said single digit numerals representing calendar years, months of a year and dates of a month range between zero to six inclusive.

* * * * *